US008522276B2

(12) United States Patent  
Angiolillo et al.

(10) Patent No.: US 8,522,276 B2  
(45) Date of Patent: Aug. 27, 2013

(54) SYSTEM AND METHODS FOR VOICING TEXT IN AN INTERACTIVE PROGRAMMING GUIDE

(75) Inventors: Joel Stephen Angiolillo, Weston, MA (US); Christina Lynn Fyock, Sudbury, MA (US); James Edward Paschetto, Waltham, MA (US); Xi Zhang, Newton, MA (US); Vincent Phuah, Waltham, MA (US)

(73) Assignees: Verizon Services Organization Inc., Irving, TX (US); Verizon Laboratories Inc., Waltham, MA (US)

( * ) Notice: Subject to any disclaimer, the term of this patent is extended or adjusted under 35 U.S.C. 154(b) by 607 days.

(21) Appl. No.: 11/356,091

(22) Filed: Feb. 17, 2006

(65) Prior Publication Data

US 2007/0199018 A1  Aug. 23, 2007

(51) Int. Cl.
*G06F 3/00* (2006.01)
*G06F 13/00* (2006.01)
*H04N 5/445* (2011.01)

(52) U.S. Cl.
USPC .................................. 725/39; 725/40; 725/45

(58) Field of Classification Search
USPC ............................. 725/39, 37, 38, 40, 45, 52
See application file for complete search history.

(56) References Cited

U.S. PATENT DOCUMENTS

| | | | |
|---|---|---|---|
| 4,918,603 A | 4/1990 | Hughes et al. | |
| 5,018,736 A | 5/1991 | Pearson et al. | |
| 5,155,591 A | 10/1992 | Wachob | |
| 5,846,132 A | 12/1998 | Junkin | |
| 5,860,862 A | 1/1999 | Junkin | |
| 5,945,987 A | 8/1999 | Dunn | |
| 5,971,854 A | 10/1999 | Pearson et al. | |
| 6,009,355 A | 12/1999 | Obradovich et al. | |
| 6,081,830 A | 6/2000 | Schindler | |
| 6,165,071 A | 12/2000 | Weiss | |
| 6,193,610 B1 | 2/2001 | Junkin | |
| 6,280,323 B1 | 8/2001 | Yamazaki et al. | |
| 6,324,694 B1 | 11/2001 | Watts et al. | |
| 6,371,855 B1 | 4/2002 | Gavriloff | |

(Continued)

FOREIGN PATENT DOCUMENTS

| | | |
|---|---|---|
| CN | 1517930 | 8/2004 |
| EP | 1489800 | 12/2004 |

(Continued)

OTHER PUBLICATIONS

Michael, Bill and Jainschigg, John, "Instant Messaging," Call Center, Jan. 5, 2001, <http://www.cconvergence.com/GLOBAL/stg/commweb_shared/shared/article/showArticle.jhtml?articleId=8700996&pgno=1>, (4 pages).

(Continued)

*Primary Examiner* — John Schnurr

(57) ABSTRACT

Systems and methods are provided for enhanced television services such as an interactive audio programming guide for a television. Users may use an input device, such as a remote control, to select display objects displayed on an output device, such as a television, as part of an interactive programming guide. An IPG module on a network terminal, such as a set top box, may determine whether the display object requires an audio representation. If an audio representation is required, the set top box may transmit an audio representation of the display object to the television to be played for the user.

21 Claims, 8 Drawing Sheets

(56) References Cited

U.S. PATENT DOCUMENTS

| | | |
|---|---|---|
| 6,442,598 B1 | 8/2002 | Wright et al. |
| 6,565,084 B1 | 5/2003 | Katz et al. |
| 6,669,565 B2 | 12/2003 | Liegey |
| 6,688,978 B1 | 2/2004 | Herman |
| 6,733,383 B2 | 5/2004 | Busse et al. |
| 6,749,198 B2 | 6/2004 | Katz et al. |
| 6,760,595 B2 | 7/2004 | Inselberg |
| 6,773,350 B2 | 8/2004 | Yoshimi et al. |
| 6,774,926 B1 | 8/2004 | Ellis et al. |
| RE38,600 E | 9/2004 | Mankovitz |
| 6,811,484 B2 | 11/2004 | Katz et al. |
| 7,001,279 B1 | 2/2006 | Barber et al. |
| 7,006,616 B1 | 2/2006 | Christofferson et al. |
| 7,120,871 B1 | 10/2006 | Harrington |
| 7,123,930 B2 | 10/2006 | Inselberg |
| 7,159,235 B2 | 1/2007 | Son et al. |
| 7,178,158 B2 * | 2/2007 | Nishina et al. ............... 725/43 |
| 7,243,139 B2 | 7/2007 | Ullman et al. |
| 7,294,776 B2 | 11/2007 | Tohgi et al. |
| 7,346,556 B2 | 3/2008 | Upendran et al. |
| 7,409,437 B2 | 8/2008 | Ullman et al. |
| 7,631,327 B2 | 12/2009 | Dempski et al. |
| 7,669,219 B2 | 2/2010 | Scott, III |
| 2002/0059621 A1 | 5/2002 | Thomas et al. |
| 2002/0089610 A1 | 7/2002 | Ohno et al. |
| 2002/0138843 A1 | 9/2002 | Samaan et al. |
| 2002/0142842 A1 | 10/2002 | Easley et al. |
| 2002/0144273 A1 | 10/2002 | Reto |
| 2002/0157099 A1 | 10/2002 | Schrader et al. |
| 2002/0157101 A1 | 10/2002 | Schrader et al. |
| 2002/0166123 A1 | 11/2002 | Schrader et al. |
| 2003/0002849 A1 | 1/2003 | Lord |
| 2003/0005446 A1 | 1/2003 | Jaff et al. |
| 2003/0028892 A1 | 2/2003 | Gewickey et al. |
| 2003/0172375 A1 | 9/2003 | Shaw et al. |
| 2003/0182663 A1 | 9/2003 | Gudorf et al. |
| 2003/0191816 A1 | 10/2003 | Landress et al. |
| 2003/0229900 A1 | 12/2003 | Reisman |
| 2004/0017396 A1 | 1/2004 | Werndorfer et al. |
| 2004/0019912 A1 | 1/2004 | Staack |
| 2004/0031058 A1 | 2/2004 | Reisman |
| 2004/0117852 A1 | 6/2004 | Karaoguz et al. |
| 2004/0139233 A1 | 7/2004 | Kellerman et al. |
| 2004/0159215 A1 | 8/2004 | Tohgi et al. |
| 2004/0168187 A1 * | 8/2004 | Chang .............................. 725/40 |
| 2004/0194137 A1 * | 9/2004 | Shreesha ......................... 725/41 |
| 2004/0198495 A1 | 10/2004 | Cisneros |
| 2004/0231003 A1 | 11/2004 | Cooper et al. |
| 2004/0261106 A1 | 12/2004 | Hoffman |
| 2005/0028208 A1 | 2/2005 | Ellis et al. |
| 2005/0066362 A1 | 3/2005 | Rambo |
| 2005/0066364 A1 | 3/2005 | Rambo |
| 2005/0076362 A1 | 4/2005 | Dukes et al. |
| 2005/0086358 A1 | 4/2005 | Rosenberg |
| 2005/0091694 A1 | 4/2005 | Rambo |
| 2005/0108767 A1 | 5/2005 | Ma |
| 2005/0246457 A1 | 11/2005 | Parry et al. |
| 2005/0246757 A1 | 11/2005 | Relan et al. |
| 2005/0262542 A1 | 11/2005 | DeWeese et al. |
| 2006/0015745 A1 | 1/2006 | Sukigara et al. |
| 2006/0039361 A1 | 2/2006 | Ohno et al. |
| 2006/0123455 A1 | 6/2006 | Pai et al. |
| 2006/0137015 A1 | 6/2006 | Fahrny et al. |
| 2006/0183547 A1 | 8/2006 | McMonigle |
| 2007/0028287 A1 | 2/2007 | Yamamoto et al. |
| 2007/0060380 A1 | 3/2007 | McMonigle et al. |
| 2007/0061837 A1 | 3/2007 | Dadush |
| 2007/0107019 A1 | 5/2007 | Romano et al. |
| 2007/0115845 A1 | 5/2007 | Hochwarth et al. |
| 2007/0124795 A1 | 5/2007 | McKissick et al. |
| 2007/0129123 A1 | 6/2007 | Eryou et al. |
| 2007/0157281 A1 | 7/2007 | Ellis et al. |
| 2007/0198738 A1 | 8/2007 | Angiolillo et al. |
| 2007/0199019 A1 | 8/2007 | Angiolillo et al. |
| 2007/0199025 A1 | 8/2007 | Angiolillo et al. |
| 2007/0204308 A1 | 8/2007 | Nicholas et al. |
| 2008/0140406 A1 * | 6/2008 | Burazerovic et al. ......... 704/260 |
| 2008/0141303 A1 | 6/2008 | Walker et al. |
| 2011/0107220 A1 | 5/2011 | Perlman |

FOREIGN PATENT DOCUMENTS

| | | |
|---|---|---|
| WO | 01/46818 | 6/2001 |
| WO | 02/19701 | 3/2002 |
| WO | WO-02/102079 | 12/2002 |
| WO | WO-2005/003899 | 1/2005 |
| WO | WO-2006/012788 | 2/2006 |

OTHER PUBLICATIONS

"Instant Messaging and Presence," SIP Showcase, accessed Oct. 27, 2005, <http://www.sipcenter.com/sip.nsf/html/Instant+Messaging+and+Presence>, (2 pages).

Regan, Tim and Todd, Ian, "Media Center Buddies: Instant Messaging around a Media Center," Technical Report MSR-TR-2004-47, Microsoft Research, Jun. 2, 2004, <http://research.microsoft.com/research/pubs/view.aspx?type=Technical%20Report&id=751> (9 pages).

"Comcast and Microsoft Announce Agreement to Trial Microsoft TV Software," Microsoft TV Press Release, Jul. 21, 2003, http://www.microsoft.com/tv/content/PressReleases/MSTVComcastPR.mspx> (2 pages).

"AINGR: Switch—Service Control Point(SCP)/Adjunct Interface," Telcordia Technologies Generic Requirements GR-1299-CORE, Issue 7, Nov. 2001, (542 pages).

"AINGR: Switching Systems," Telcordia Technologies Generic Requirements GR-1298-CORE, Issue 7, Nov. 2001, (2206 pages).

Handley, M., Schulzrinne, H., Schooler, E., and Rosenberg, J., "RFC 2543—SIP: Session Initiation Protocol," The Internet Society, Mar. 1999, (132 pages).

Rosenberg, J., "RFC 3856—A Presence Event Package for the Session Initiation Protocol (SIP)," The Internent Society, Aug. 2004, (25 pages).

Fujimoto, S., Sugano, H., Klyne, G., Bateman, A., Carr, W., and Peterson, J., "RFC 3863—Presence Information Data Format (PIDF)," The Internet Society, Aug. 2004, (31 pages).

"Fantasy Sports Trade Association" <http://www.fsta.org/index.shtml> (accessed Aug. 26, 2005).

Batts, Battino, "Sports Fans become CEOs in Multibillion-Dollar Fantasy Leagues," Virginian-Pilot, Knight Ridder/Tribune Business Review, Sep. 26, 2004.

"Fantasy Sports is our Undiscovered Game," Jul. 28, 2004, <http://www.electronicgamingbusiness.com>.

Tedeschi, Bob, "Advertisers Discover the Value of Young Men with Time and Money to Spend on Fantasy Sports on the Web," New York Times, Aug. 23, 2004, p. C7.

Kessler, Scott, "Hot Players in Online Gaming," Business Week Online, May 24, 2004, <http://www.businessweek.com/investor/content/may2004/pi20040524_2927_pi044.htm>.

Hurtt, Rob, "Get in the Game: Think You Know Football? Put it to Use. Fantasy Leagues Have Something to Offer Every Fan, Even Old-Schoolers," The Sporting News, Aug. 30. 2004.

Wendel, Tim, "How Fantasy Games Have Changed Fans," USA Today, <http://www.usatoday.com/news/opinion/editorials> (posted Sep. 19, 2004).

Delaney, Kevin, "Fantasy Sports Lures AOL, Electronic Arts as More Fans Join in", Wall Street Journal, Sep. 9, 2004, p. B1.

Arthur, Bruce, "It's Fantasy-astic: Fantasy Football has Become a Monster in North America, Which Explains My Sudden Interest in Guys Named Morten," National Post, Toronto Edition, Sep. 27, 2004, p. S2.

Levy, Paul, "The Teams Aren't Real, but Money Is: Fantasy Sports have Caught Corporations' Attention," Minneapolis Star Tribune, Aug. 29, 2004, p. 1A.

Hoffarth, Tom, "Fantasy Football is TV's Reality," The Daily News of Los Angeles, Sep. 10, 2004, p. S2.

Warley, Stephen, "Sports iTV: The Sporting News," Oct. 23, 2002, <http://www.tvspy.com/nexttv/nexttvcolumn.cfm?t_nexttv_id=581&page=1&t_content_cat_id=10>.

Page from www.tivo.com/4.9.5.asp for Digital Photo Viewer Printed Aug. 16, 2005 (1 page).
Page from www.snapfish.com for Snapfish Printed Aug. 16, 2005 (1 page).
Page from www.ofoto.com for Kodak EasyShare Gallery Printed Aug. 16, 2005 (1 page).
Page from http://photos.yahoo.com for Yahoo! Photos Printed Aug. 16, 2005 (1 page).
"Microsoft TV Photo Viewer Provides a Simple New Way to View Digital Photos on Home Television Sets," www.microsoft.com/presspass/features/2001/sep01/09-20tvphotoviewer.mspx Printed Aug. 16, 2005 (2 pages).
"Interactive TV stuck in zip?" Printed Aug. 25, 2005 from http://www.mediaweek.co.uk/articles/2004/7/20/InteractiveTVstuckinzip (4 pages).
"That Wonderful Honda Ad" Printed on Aug. 25, 2005 from http://battellemedia.com/archives/000137.php (6 pages).
"Welcome to the Honda Multimedia" Printed on Aug. 25. 2005 from http://www.honda.co.uk/multimedia/ (1 page).
"Honda Interactive TV Campaign to Explain New IMA Technology" Printed Aug. 25, 2005 from http://www.e-consultancy.com/about/press.asp?id=166 (3 pages).
"Zip TV Debuts With Interactive Content for Honda Campaign" Printed on Aug. 25, 2005 from http://www.aiada.org/article.asp?id=20603 (2 pages).
"Interactive TV Advertising: Turning Viewers Into Direct Leads Without a Set-Top Box" Printed Aug. 25, 2005 from http://www.broadcastpapers.com/data/IKSInteractiveTV02.htm (4 pages).
Tawani et al., "Context Aware Personalized Ad Insertion an Interactive TV Environment," Satyam Computer Services Limited. Printed Aug. 25, 2005 from http://www.di.unito.it/~lillana/TV04/FINAL/thawani.pdf (6 pages).
"Wink Communications Launching Interactive TV Commercials" Printed Aug. 31, 2005 from www.clickz.com/news/article/pp/16761 (4 pages).
"Zip TV Channel Launches with Exclusive Honda Video" Printed Aug. 31, 2005 from www.immediatefuture.co.uk/296 (24 pages).
"An Introduction to Screen Readers," Printed Jul. 19, 2007, from http://web.archive.org/web/20040404135336/http://mason.gmu.edu/~swidmaye/portfolio/edit797assistivetech.htm (5 pages).
Speir, Michelle, "Screen Readers Open Windows for the Blind," Printed Jul. 19, 2001 , from http://www.fcw.com/fcw/articles/2000/0807/cov-access3-08-07-00.asp. (3 pages).
"Alternative Web Browsing," Printed Jul. 19, 2007, from http://www.w3.org/WAI/References/Browsing.html. (4 pages).
"BBC, Channel 4 and ITV to Extend Audio Description Service," Jun. 21, 2004, http://www.bbc.co.uk/pressoffice/pressreleases/stories/2004/06_june21/audio.shtml, (2 pages).
"Audio Descriptions," Newsletter for Apr. 2004, <http://www.eabnet.org.uk/knowitall/finally/teabreak/newsletters/April/April2004.htm> (accessed Jul. 5, 2005), (4 pages).
"TV for the Blind—New Audio Description Tool Changes TV Experience," Netgem Press Release, Jan. 13, 2004, <http://www.netgemdirect.com/files/homepage/tvfortheblind>, (2 pages).
Netgem i-Player Ad, <http://www.netgemdirect.com/default.asp?action=produit&id_prod=5> (accessed Jul. 6, 2005), (1 page).
"Five to Use BskyB's Audio Description Technology," British Sky Broadcasting Group Press Release, Nov. 18, 2003, <http://www1.sky.com/disability/release2.htm>, (2 pages).
"BBC, Channel 4 and ITV to Extend Audio Description Service," Jun. 21, 2004, http://www.bbc.co.uk/pressoffice/pressreleases/stories/2004/06_june21/audio.shtml. (2 pages).
"TV for the Blind—New Audio Description Tool Changes TV Experience," Netgem Press Release, Jan. 13. 2004, <http://www.netgemdirect.com/files/homepage/tvfortheblind, (2 pages).
Netgem i-Player AD. <http//www.netgemdirect.com/default.asp?action=produit&id_prod=5> (accessed Jul. 6, 2005), (1 page).
PCT international Search Report and Written Opinion in PCT Application No. PCT/US07/03910, Filed Dec. 12, 2007.
International Search Report and Written Opinion dated Jul. 28, 2008 issued for international application No. PCT/US07/03908, 11 pages.
Written Opinion Dated Aug. 25, 2008 issued for international application No. PCT/US07/03907, 5 pages.
Written Opinion Dated Dec. 13, 2007 issued for international application No. PCT/US07/03909, 4 pages.
Regan, Tim et al., "Media Center Buddies: Instant Messaging Around a Media Center," Technical Report MSR-TR-2004-47, Microsoft Research, Jun. 2, 2004, p. 1-9.
International Search report and Written Opinion Dated Aug. 25, 2008 issued for international aplplication No. PCT/US07/03907, 14 pages.
International Search report and Written Opinion Dated Dec. 13, 2007 issued for interantional aplplication No. PCT/US07/03909, 11 pages.
U.S. Appl. No. 11/356,090.
U.S. Appl. No. 11/356,053.
U.S. Appl. No. 11/356,052.
Chorianopoulos, "Content-Enriched Communication—Supporting the Social Uses of TV", British Telecommunications Engineering, British Telecommunications Engineering London, GB, vol. 6, No. 1, Jan. 1, 2007, pp. 23-29, XP001507678, ISSN: 02.
Graefen, "Mit Samba Wird Aus Linux Ein Stabiler Windows Datei-Und Druckserver", NTZ (Nachrichtentechnische Zeitschrift), VDE Verlag GmbH, DE, vol. 52, No. 6, Jan. 1, 1999, p. 32/33, XP000846989, ISSN: 0948-728X.
The American Heritage College Dictionary, fourth edition, Houghton Mifflin Company, 2002, p. 842.

* cited by examiner

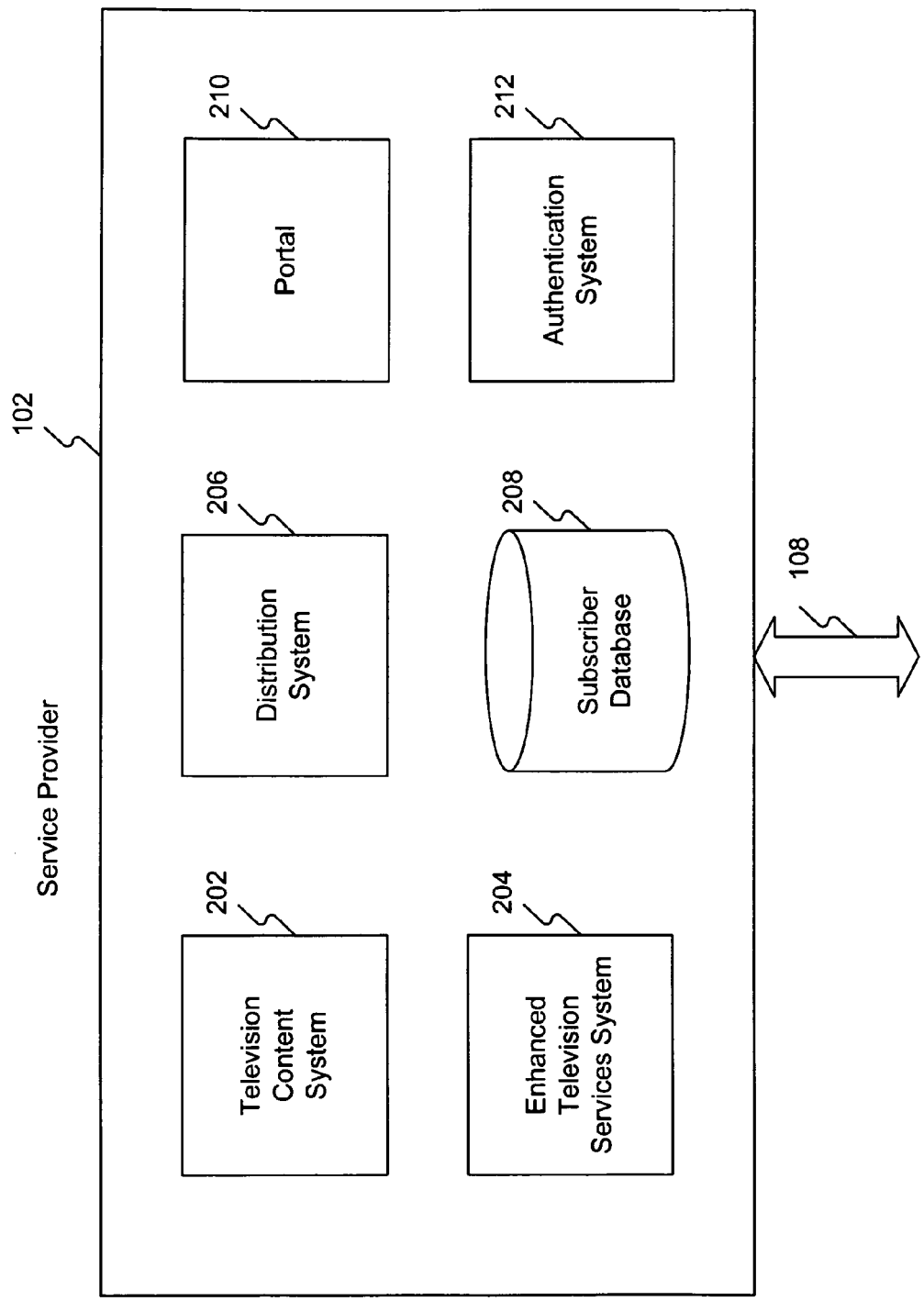

SYSTEM AND METHODS FOR VOICING TEXT IN AN INTERACTIVE PROGRAMMING GUIDE

RELATED APPLICATIONS

The applications listed below are related to this application and are being filed on the same date as this application:

U.S. patent application Ser. No. 11/356,090, entitled "Systems and Methods for Providing Supplementary Television Content;"

U.S. patent application Ser. No. 11/356,053, entitled "Systems and Methods for Shared Viewing Via Television;"

U.S. patent application Ser. No. 11/356,052, entitled "Systems and Methods for Fantasy League Service Via Television;"

U.S. patent application Ser. No. 11/356,056, entitled "Television Integrated Chat and Presence Systems and Methods;"

U.S. patent application Ser. No. 11/356,094, entitled "Systems and Methods for Providing a Personal Channel Via Television;" and U.S. patent application Ser. No. 11/356,092, entitled "Systems and Methods for Providing a Shared Folder via Television."

TECHNICAL FIELD

The present application is generally directed to communications networks having video transmission capabilities. The embodiments described herein are more specifically directed to systems and methods to receive and transmit enhanced television services over high bandwidth access networks.

BACKGROUND INFORMATION

Consumers and businesses today receive television services from a variety of sources. Using even the most basic television set, viewers can receive traditional television broadcasts via an antenna connected to the television set. The problems with traditional broadcast television are well known. To receive a television signal, the receiving antenna must be within the range of a broadcast transmitter, making it difficult to receive a signal in remote places. The quality of a broadcast picture can depend on the strength or position of the antenna, leading to fuzzy pictures and constant repositioning of the antenna. Furthermore, traditional broadcast television is limited to simple viewing. The television signal is received and a picture is displayed on the viewer's television. Aside from changing channels, there is no way for viewers to customize television content or to communicate with broadcasters.

Cable television and, later, satellite television were developed to solve some of the problems associated with traditional broadcast television. Cable television providers receive television content from a variety of programming sources and transmit the content via cables, such as coaxial cables, directly to subscribers' homes. In the home, a "set top box" is typically used to receive the cable signal and provide it to the televisions for display. Although cable television does not generally suffer from the picture quality problems of over-the-air broadcast television, the use of amplifiers to carry the cable signal over long distances can cause signal degradation and reliability problems. The typical cable set top box also offers limited options for customizing content because it relies on standard broadcast television content transmissions, has generally contained limited processing functionality and has limited network interactivity capabilities (e.g., pay-per-view requests, video on demand requests).

Satellite television provides high quality television picture because its signal travels through the air (i.e., a faster and more accurate delivery medium than cable) and it does not rely on an antenna's range to the content provider. Instead, satellite providers broadcast television content to a geosynchronous satellite that rebroadcasts the content to a satellite dish at a subscriber's home. The satellite dish is typically connected to a satellite receiver that decrypts and formats the television content and delivers it to the televisions for display. However, satellite television is not without its limitations. For example, like cable television services, satellite television relies on standard broadcast content transmissions. Furthermore, satellite receivers rely on low-bandwidth conventional "plain old telephone service" (POTS) telephone lines to provide a bidirectional communication path for requests from the satellite receiver and download of customized content, so download rates are slow and available content is limited.

Digital video recorders, available as standalone components or integrated in set top boxes and satellite receivers, enable viewers to record television content. Using a menu displayed on the television, viewers may be able to select programs to be recorded, order pay-per-view content, and set viewing preferences, such as parental controls. However, typical digital video recorders use low-bandwidth POTS phone lines as a bidirectional communication path to a cable, satellite or other service provider, limiting the ability to provide any content customized specifically for a particular user.

Over the years, broadcast, cable, and satellite television have steadily improved television picture quality and some providers have developed the capacity to deliver limited enhancements to video broadcast viewing, such as pay-per-view and video-on-demand. Digital video recorders enable viewers to receive content in a limited and delayed fashion. However, there remains a need for enhanced television services that are rich, reliable, and truly customized.

Most cable and satellite television systems have on-screen menus that provide access to an on-screen program guide as well as other functions. This system of on-screen menus and commands is often called an Interactive Program Guide, or IPG. The IPG is displayed on the television or other monitor. Program objects are included in the displayed guide. Using a remote control or other input device, the user can select different items, get more details on a television program, and record shows, among other functions. One limitation of IPGs is that they are purely visual. The user must be able to see the on-screen guide to use it. Therefore, there is a need to provide access to services offered by the IPG to users with visual impairments or other disabilities by allowing them to navigate and select objects displayed on a television IPG. If the user is not able to easily read menus, prompts, and commands, then he or she will not be able to use the advanced services provided by the IPG.

BRIEF DESCRIPTION OF THE DRAWINGS

FIG. 2 a detailed block diagram of a service provider consistent with an embodiment of the present invention.

DETAILED DESCRIPTION OF PREFERRED EMBODIMENTS

Preferred methods and systems consistent with the present invention provide enhanced television services to subscribers using a high speed bi-directional connection such as a fiber optic network. A service provider transmits both general television content, such as broadcast television programs, and content that is customized for each subscriber. Subscribers communicate with the service provider to perform any number of tasks, including establishing an account, ordering customized content, and sharing content with other subscribers.

Figure 1:
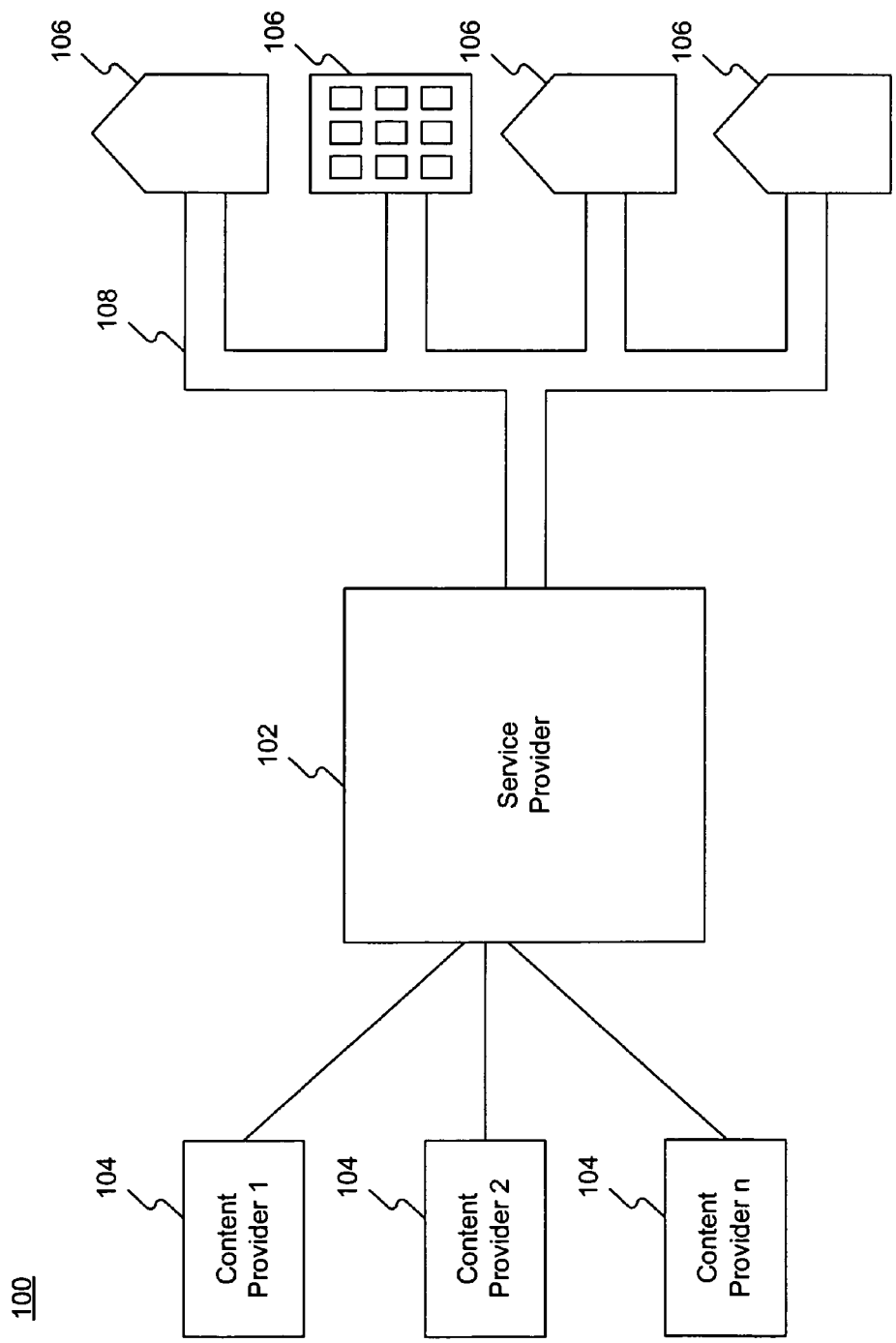
FIG. 1 is a block diagram of a system consistent with an embodiment of the present invention.

Reference will now be made in detail to various exemplary embodiments implemented according to the invention, examples of which are illustrated in the accompanying drawings. Wherever possible, the same reference numbers will be used throughout the drawings to refer to the same or like parts.
System Overview FIG. 1 is a block diagram of a system 100 consistent with a preferred embodiment of the present invention. A service provider 102 collects content (e.g., broadcast video, broadcast audio, audio/video on demand, data content), from a plurality of content providers 104. Such content may include, for example, programming from local broadcast television channels, programming from national broadcast television content providers such as Home Box Office or ESPN, and educational programming such as distance learning broadcasts. Service provider 102 transmits data, including the audio/video content, to subscribers 106 via an access network 108. Subscribers 106 may include homes, businesses, hotels, etc. In the preferred embodiment, access network 108 consists mainly of fiber optic cables and connectors, enabling high speed, two-way communication between service provider 102 and subscribers 106. Access network 108 may also include other networking technologies, such as wireless networking. In one embodiment, service provider 102 and subscribers 106 may also be able to communicate via alternate networks that may interconnect the service provider 102 and subscribers 106, such as the Internet (not shown).

FIG. 2 is a block diagram of a service provider 102 consistent with the preferred embodiment of the present invention. Service provider 102 may provide multiple services to subscribers 106. For example, service provider 102 may establish and maintain subscriber accounts, provide regular broadcast television programming, provide on-demand video content, enable subscriber feedback, etc. Service provider 102 may also enable subscribers 106 to obtain enhanced services, such as described below.

Exemplary service provider 102 may include various systems and facilities to receive, store, process and transmit content for provision to subscribers 106. For example, exemplary service provider 102 may include a television content system 202, an enhanced television services system 204, a distribution system 206, a subscriber database 208, a portal 210, and an authentication system 212. Television content system 202 may receive, store, process and transmit broadcast television content originated by content providers 104. In one embodiment, service provider 102 may also create television content and store and transmit such content using television content system 202. Enhanced television services system 204 may receive, store, process and transmit data to support enhanced television services and provide subscriber interfaces for accessing enhanced television services (as further discussed below).

Distribution system 206 may distribute content and data, e.g., from television content system 202 or enhanced television services system 204, to subscribers 106. Distribution system 206 may perform broadcast/multicast delivery (e.g., to send the same information to many subscribers simultaneously) or unicast delivery (e.g., to send customized content to a single subscriber). Distribution system 206 may also provide an "upstream" communications path from subscribers 106 to, for example, enhanced television services system 204, such that subscribers may send requests and other information related to obtaining customized content, among other things.

Subscriber database 208 may store data about subscribers 106 such as name, address, subscriptions to enhanced services, etc. Portal 210 may provide an interface for communications with service provider 102 via an external network, such as the public switched telephone network or a wide area network such as the Internet. Authentication system 212 may process authentication and/or authorization information to enforce security and privacy for providing services to subscribers 106.

A skilled artisan will recognize that service provider 102 may include more or fewer components than are shown in FIG. 2, and more or combined functionality compared to that illustrated in FIG. 2. For example, a separate database may be provided to store authentication information used by authentication system 212. In another example, service provider 102 may include telecommunications and/or conference bridge facilities to enable subscribers 106 to access audio/video telecommunications and/or teleconference services (e.g., available through enhanced television services). Additionally, the functionality of service provider 102 may be performed by a single system, or by a combination of computers and other equipment, which may be distributed over multiple locations and interconnected by various communications links. The operation of the components of service provider 102 is described in greater detail below.

In another example, service provider 102 may include an interactive program guide server for transmitting an interactive program guide and related audio data to subscriber 106.

Figure 3A:
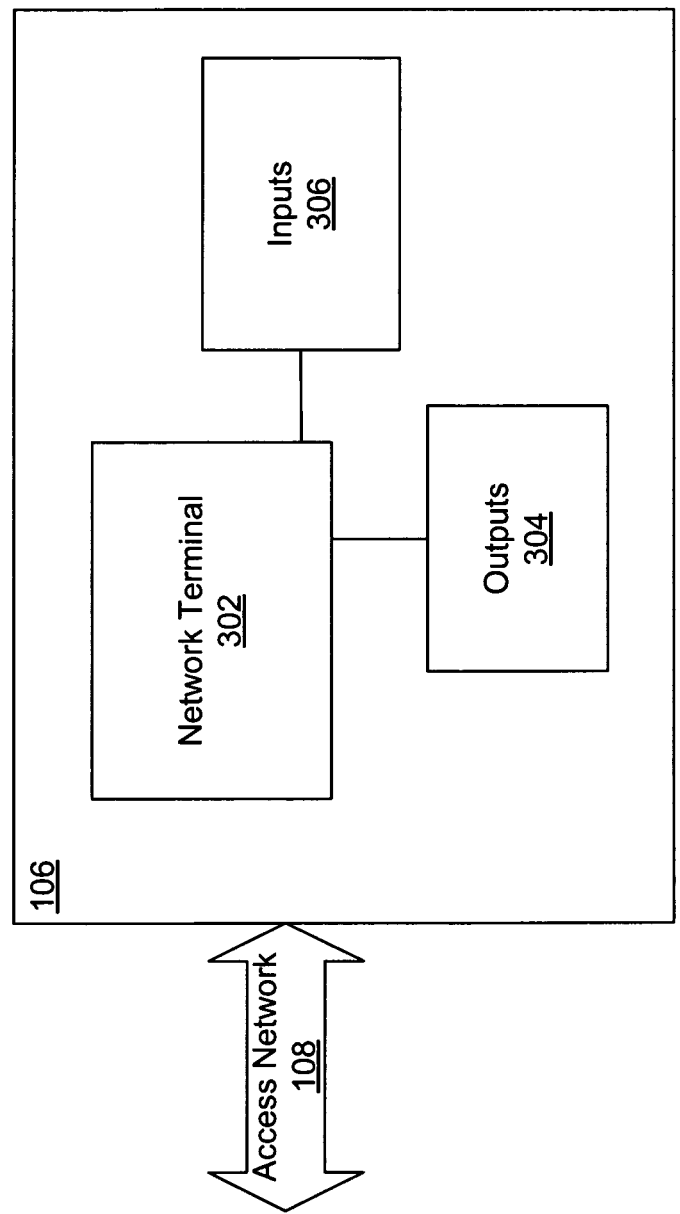
FIGS. 3(a) and 3(b) are detailed block diagrams of a subscriber consistent with an embodiment of the present invention.
Figure 3B:
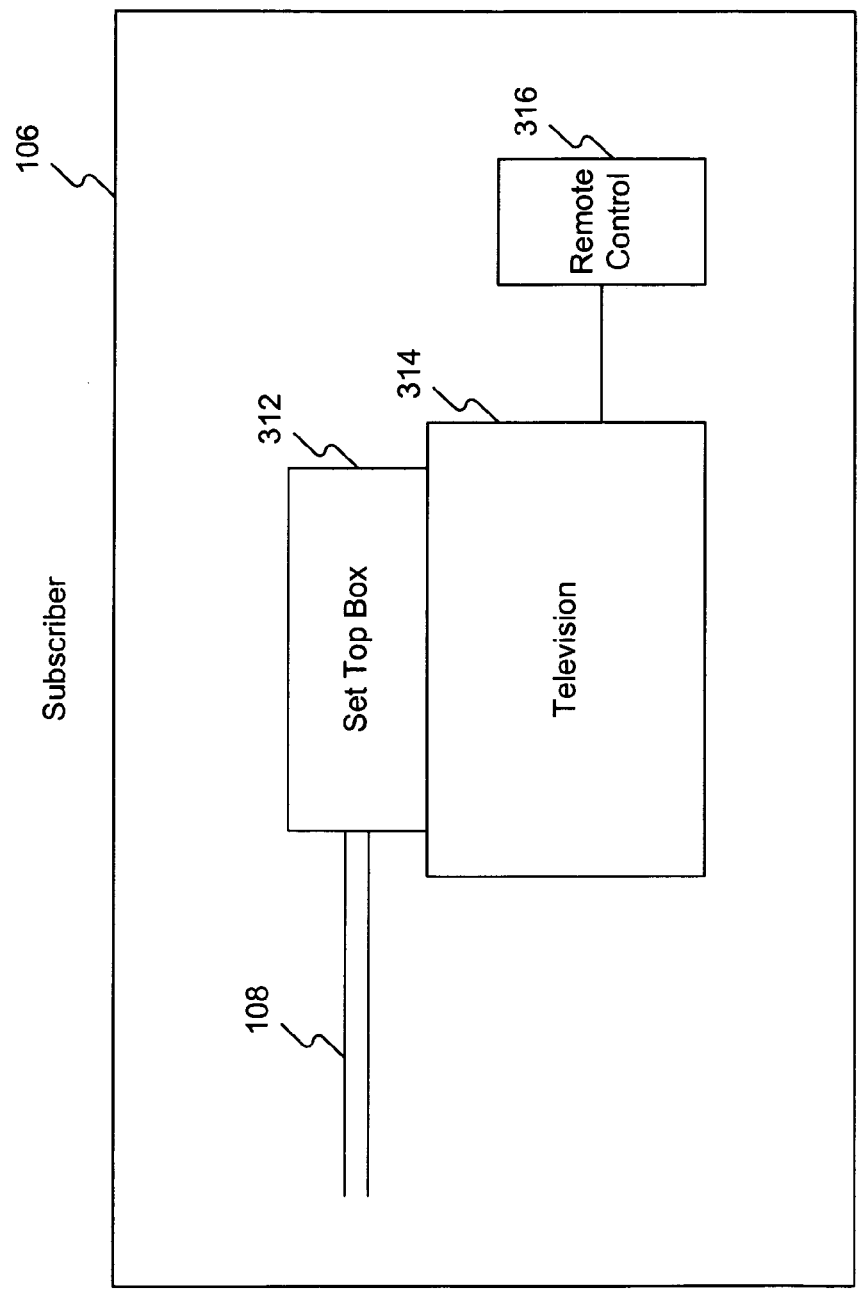

FIGS. 3(a) and 3(b) illustrate block diagrams of a subscriber 106 consistent with a preferred embodiment of the present invention. As shown in FIG. 3(a), subscriber 106 receives transmissions from service provider 102 via access network 108 at a network terminal 302. As described above, access network 108 may be, for example, a passive optical network (PON). The network terminal 302 may receive the network transmissions from service provider 102 via any number of intermediate components/technologies. For example, an optical-to-electrical conversion component may be interposed between the network terminal 302 and service provider 102 in order to convert optical transmissions to electrical signals (e.g., RF signals, POTS signals, Ethernet signals), as well as other transport components that may be deployed therebetween.

Network terminal 302 processes data received via access network 108 and presents it to output devices 304. As such, network terminal 302 may include processors, storage systems, network interfaces (e.g., to access network 108) and device interfaces, as generally known. Output devices 304 can include any number of components with the capabilities to output audio and/or video, such as video displays, speakers, television sets, etc. Network terminal 302 is also connected to one or more input devices 306, which allow users to provide input data, for example, to control the network terminal 302 or output devices 304, or provide data for upstream transmission over access network 108. Input devices 306 can include devices such as keyboards, pointing devices, remote controllers, touch screens, etc. In certain embodiments, network terminal 302 may be integrated with any or all of the output devices 304, as well as any or all of the input devices 306 (an example of which would be a mobile telephone). In some embodiments, subscriber 106 may also use a separate computing system or telecommunications device such as a telephone (not shown) connected to an external network (e.g., PSTN, Internet, wireless network) to communicate with service provider 102 (e.g., via portal 210).

FIG. 3(b) illustrates a specific embodiment relative to typical television service at a subscriber 106. As shown in FIG. 3(b), the network terminal is a set top box 312 connected to access network 108 (e.g., via various technologies/components) to communicate with service provider 102. Set top box 312 is connected to television 314, which includes facilities to display video and produce audio based on signals provided by set-top box 312. A remote control 316 and other input devices (e.g., pushbuttons) are provided and may be communicatively connected to television 314 and/or set-top box 312 (e.g., wirelessly) to enable a viewer to control television 314 and/or set top box 312, and to provide data which may be transmitted over access network 108 to service provider 102, and/or other subscribers 106.

Subscriber 106 may set up an account with service provider 102 which enables and/or controls the ability to receive enhanced television services. For example, the subscriber account may be used by provider 102 to store subscriber identification information, such as a name and address, store indications of which services a subscriber is authorized to receive, such as premium broadcast channels or Internet access, and track and bill for enhanced services, such as viewing of personalized content, etc. The account may also store an identifier of the subscriber's network terminal 302 that allows for identification of the network terminal over the access network 108 (e.g., a unique identifier of a set top box 312 assigned to the subscriber), facilitating the delivery of enhanced television services to the subscriber. Subscriber 106 may access account information, for example, using portal 210 via voice communications (e.g., an interactive voice response system) or data communications (e.g., an interactive web interface over the Internet). Alternatively, a subscriber may use a phone integrated into set top box 312 or controls available in remote control 316 to communicate with service provider 102 over access network 108.

Subscriber 106 may include several users. For example, within a single household, different family members may desire to receive different content or subscribe to different enhanced television services from service provider 102. In one embodiment, a subscriber 106 (e.g., a household) may establish an account with service provider 102 and each user (e.g., family members in the household) is associated with that account and may have information stored in subscriber database 208. In another embodiment, each user may establish his own account with service provider 102.

Figure 4:
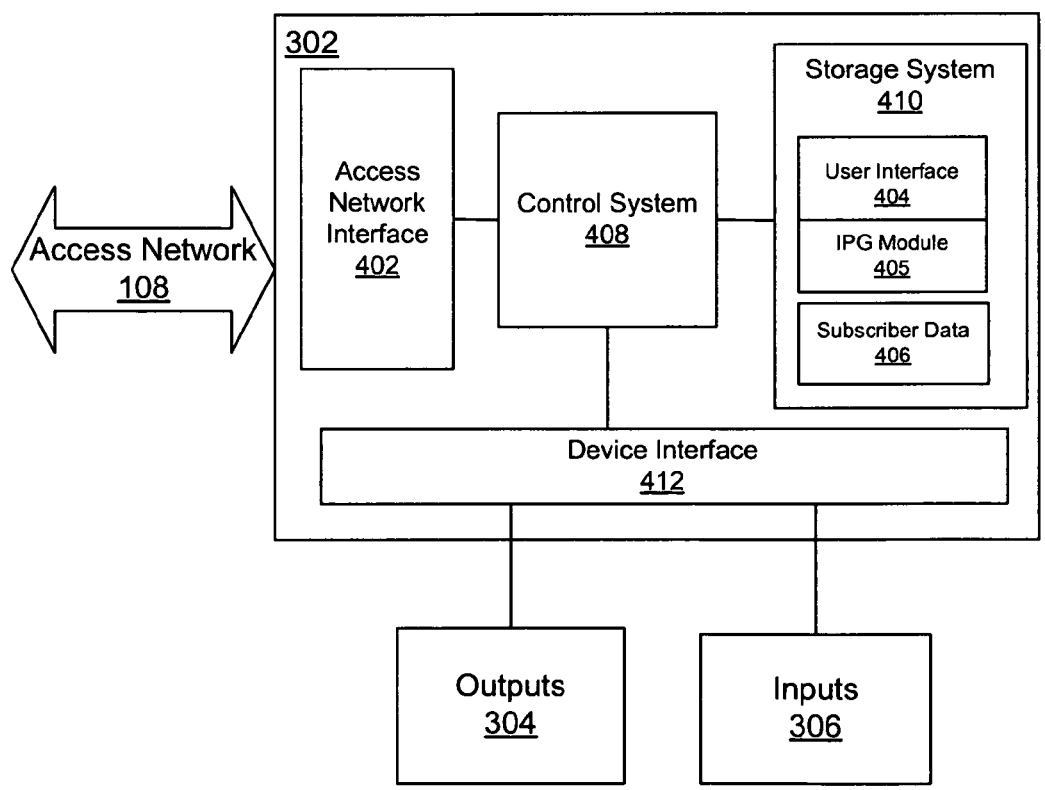
FIG. 4 is a detailed block diagram of a network terminal consistent with an embodiment of the present invention.

FIG. 4 is a detailed block diagram of a preferred network terminal 302 (such as set top box 312). Network terminal 302 may include an access network interface 402, control system 408, storage system 410 and device interface 412. Control system 408 may include processors or other control logic, which may be used to execute various instructions and manipulate data stored in storage system 410. Storage system 410 may include various storage devices and controllers, such as semiconductor memories (e.g. RAM, ROM, flash), magnetic memories (e.g., disk), optical memories (e.g., DVDs), memory controllers and/or other storage, as is well known. Device interfaces 412 may include various components to interface with external components, such as output devices 304 and input devices 306, as generally known.

Using the access network interface 402, network terminal 302 communicates with service provider 102 to send and receive high speed communications for television programming, enhanced television services, subscriber account management, etc., over access network 108. Access network interface 402 may include various components to allow for communications over access network 108 in one or more forms, depending on the implementation. For example, access network interface 108 may include an RF interface to receive RF signals and/or an optical interface to receive optical signals. Access network interface 402 may further include components to distinguish between and process various communications carried over access network 108. For example, access network interface 402 may include components to receive broadcast-television-formatted transmissions (e.g., NTSC, MPEG) and/or packet-data-formatted transmissions (e.g., Ethernet, IP). In some embodiments, access network interface 402 may also be connected to device interface 412, for example, to provide broadcast television transmissions to output devices 304.

Storage system 410 may include various modules executable by the control system 408 and implementing various features in the preferred embodiment. For example, storage system 410 stores a user interface 404 comprising one or more displays (e.g., an interactive program guide) which may be provided on output devices 304 to enable subscriber 106 to communicate with network terminal 302, select content for viewing, access enhanced viewing features, etc. User interface 404 may include various user interfaces to utilize enhanced television services available through service provider 102, for example, downloaded from service provider 102. Subscriber data 406 may also be stored in storage system 410 to support enhanced television services. For example, a subscriber's viewing preferences or settings may be stored as subscriber data 406. In another example, subscriber data 406 may be stored outside network terminal 302, such as at service provider 102 (e.g., in subscriber database 208) or on a computing system or other device controlled by the subscriber (e.g., a smart card).

Network terminal 302 may include fewer or more components than are shown in FIG. 4, as is well known, and may be interconnected in various ways using buses, etc., as is well known.

Using the interface with service provider 402, set top box 312 communicates with service provider 102 to send and receive high speed data for television programming, enhanced television services, subscriber account management, etc. Information related to enhanced television services, such as, for example, audio representations of interactive programming guide display objects and program schedules for the interactive program guide, may be transmitted to the set top box 312 from service provider servers, such as, for example, enhanced television services server 204 or distribution server 206, over data channel 108. User interface 404 may include an interactive programming guide module 405 to store and display menus, audio data, and other data to enable subscriber 106 to select content for viewing, select shows to record, etc. User interface 404 may be comprised of software, hardware, and/or a combination of software and hardware. Subscriber data 406 may be stored in network terminal 302 to support enhanced television services. For example, a subscriber's viewing preferences or settings may be stored as subscriber data 406. Device interface 412 may include a remote control receiver to receive input signals transmitted from a remote control device, which is a type of input device 306.

Enhanced Television Services

The preferred embodiment uses a high-bandwidth bi-directional access network 108 to provide enhanced television services. For example, a service provider may provide a multitude of enhanced services to a subscriber by allowing the subscriber to connect with the service provider via such a high-bandwidth bi-directional access network to obtain, configure and control the delivery of desired television content and related services. A preferred embodiment utilizes a fiber optic access network, although other high-bandwidth technologies could also be used (e.g., RF wireless, RF over coaxial cables). Fiber optic connections provide much more bandwidth for transmitting data than conventional connections using radio waves or coaxial cable. Fiber, for example, can easily carry hundreds or even thousands of channels of television content, telephone services, and data services (e.g., Internet access). To leverage the additional bandwidth and quality of fiber connections, service providers may offer a wide range of enhanced television services to attract and retain subscribers.

Enhanced television services may include, for example, personalized television channels, synchronized sharing of personal content among subscribers, direct access to supplemental television content, integrated chat and presence information on television, and interactive entertainment. Subscribers may enjoy these services from their premises using familiar devices (e.g., a set-top box, a television, a remote control, etc.). In some embodiments, subscribers may have the option of using a computer or other device connected to the Internet to further customize or enhance television services.

Audio Interactive Programming Guide

One enhanced television service provided by preferred systems and methods implemented consistent with the present invention is an audio interactive programming guide (IPG). The audio interactive programming guide provides an enhanced interface for presenting program information to the user and receiving user input. One embodiment provides audio representations of display objects that are part of the interactive programming guide presented to the user as he or she interacts with the IPG. The IPG may be displayed (including playing audio data) on output device 304. Display objects may be any visual objects presented as part of the IPG. Audio representations may include any audible content or representative description associated with display objects.

A user may interact with the IPG displayed on output device 304 using, for example, input device 306. For example, the user may select, using input device 306, an object displayed on the IPG. A user may select a display object by, for example, moving a cursor highlight to the display object, by "tabbing" through a series of displayed objects, or by some other method. Input device 306 may communicate with network terminal 302, output device 304, or both. In one embodiment, network terminal 302 may transmit an audio representation associated with a display object to output device 304 to be played for the user when triggered by certain user inputs, such as, for example, upon selection of a display object by the user, or when the user places the cursor on, or changes the focus to, a display object.

There are many ways to present an audio representation associated with an object. The audio representation may be created by network terminal 302, provided by service provider 102, or provided in some other manner. The audio representation may be generated by a text-to-voice converter, may be a pre-defined audio file, may be generated based on previous and current user inputs, or may be created in some other manner. The audio representation may be identified by a tag associated with a display object, identified by a global system variable, or identified in some other manner. Further, the audio could be played by speakers within any output device 304, directly attached to the network terminal 302, located within an input device 306, or located in some other auxiliary device, including, for example, special purpose headsets.

Certain examples of methods and systems will now be described with reference to FIGS. 5-7. The described examples are illustrated using a fiber optic access network and a network terminal implemented as a set-top box 312. Other access networks and/or network terminals would be equally applicable, as noted above.

Figure 5:
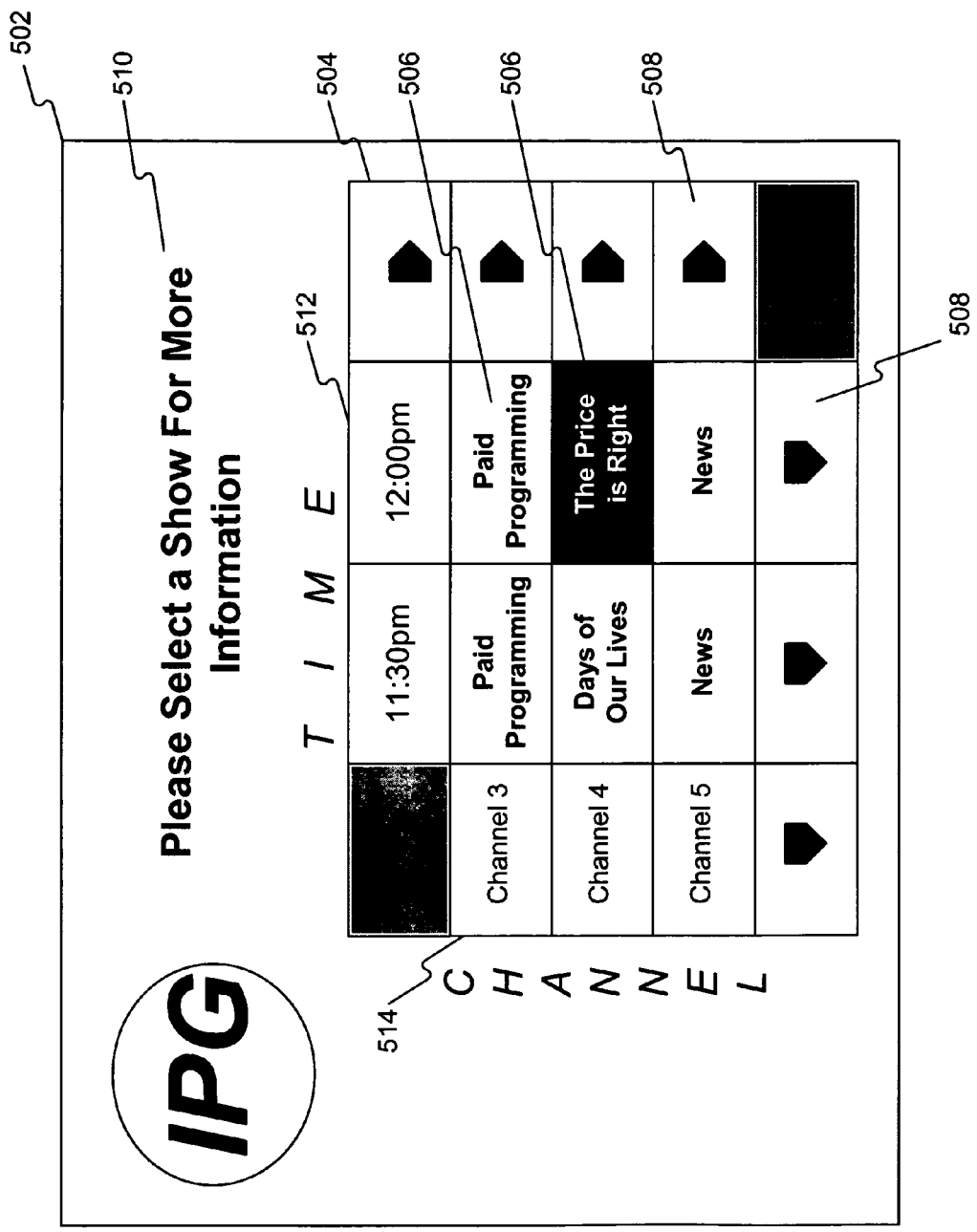
FIG. 5 is an Interactive Program Guide (IPG) display screen consistent with an embodiment of the present invention.

FIG. 5 depicts an exemplary IPG display screen consistent with an embodiment of the invention. IPG display screen 502 may consist of multiple IPG display objects. IPG display objects may include, for example, television program schedule table 504 containing program information cells 506, navigational buttons 508, and instructions 510. Television program schedule table 504 may contain time columns 512 representing start times for television programs and channel rows 514 representing different television channels. One skilled in the art will recognize that IPG display may include more or fewer components than are shown in FIG. 5. For example, IPG display screen may also contain a subscriber chat window, program preview window, program description window, etc. (not shown).

Figure 6:
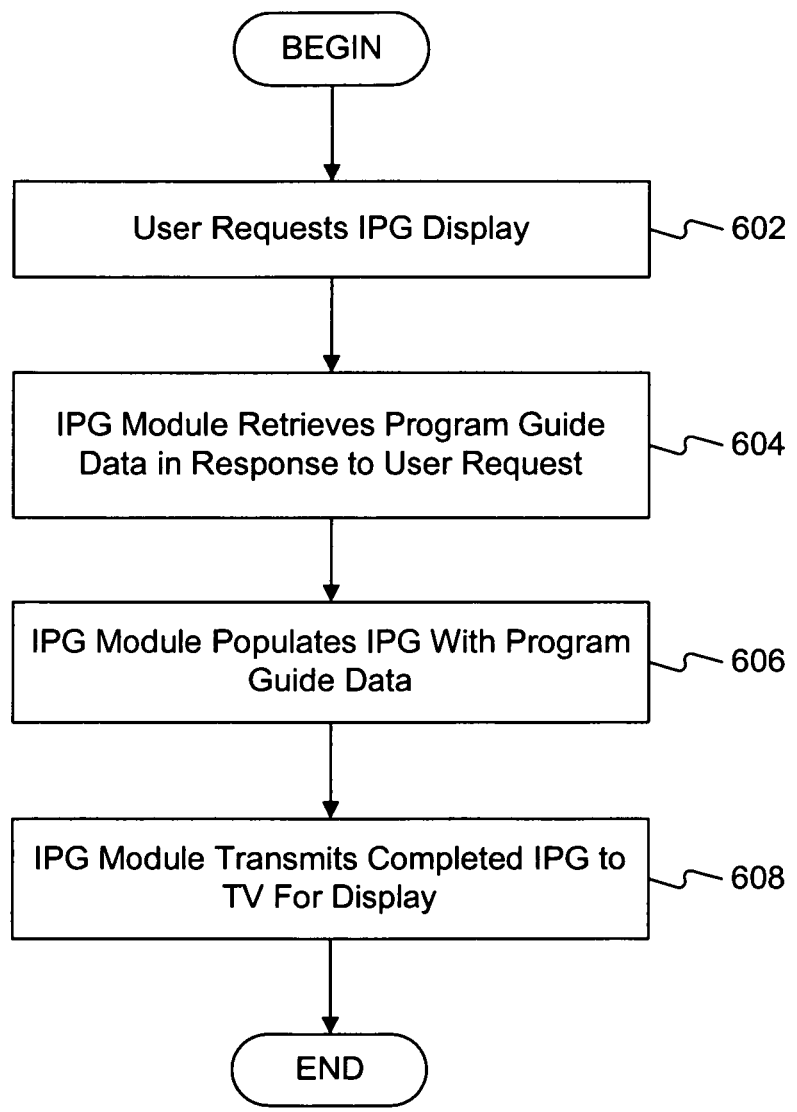
FIG. 6 is a flowchart of the process for generating the IPG display screen consistent with an embodiment of the present invention.

FIG. 6 depicts a flowchart of a process for generating an IPG display screen. The process begins when a user requests to display an IPG on television 314 (step 602). The user may request to display an IPG by using, for example, remote control 316 or another type of input device. IPG module 405 receives the user request and may then retrieve program guide data in order to create the IPG display (step 604). Program guide data may contain, among other information, television program show-times, program descriptions, channel information, advertising content, and program preview information.

In one embodiment, set top box 312 may request program guide data from service provider 102. Service provider 102 may transmit program guide data to set top box 312 from a service provider system such as, for example, distribution system 206. However, one skilled in the art will recognize that any type of system may be used, such as, for example, television content system 202 or enhanced television services system 204. In another embodiment, the program guide data may be transmitted from a third party such as, for example, a TV guide service.

In some embodiments, program guide data may be stored in set top box 312. For example, set top box 312 may periodically (e.g. once per day) receive program guide data and store such data within set top box 312 (e.g., in storage system 410). In such a case, IPG module 405 may obtain relevant program guide data from the stored local program data.

Once the program guide data is retrieved, IPG module 405 may use the data to populate the fields of the IPG and create the completed IPG display (step 606). The completed IPG display may then be transmitted to television 314 to be displayed to the user (step 608).

Figure 7:
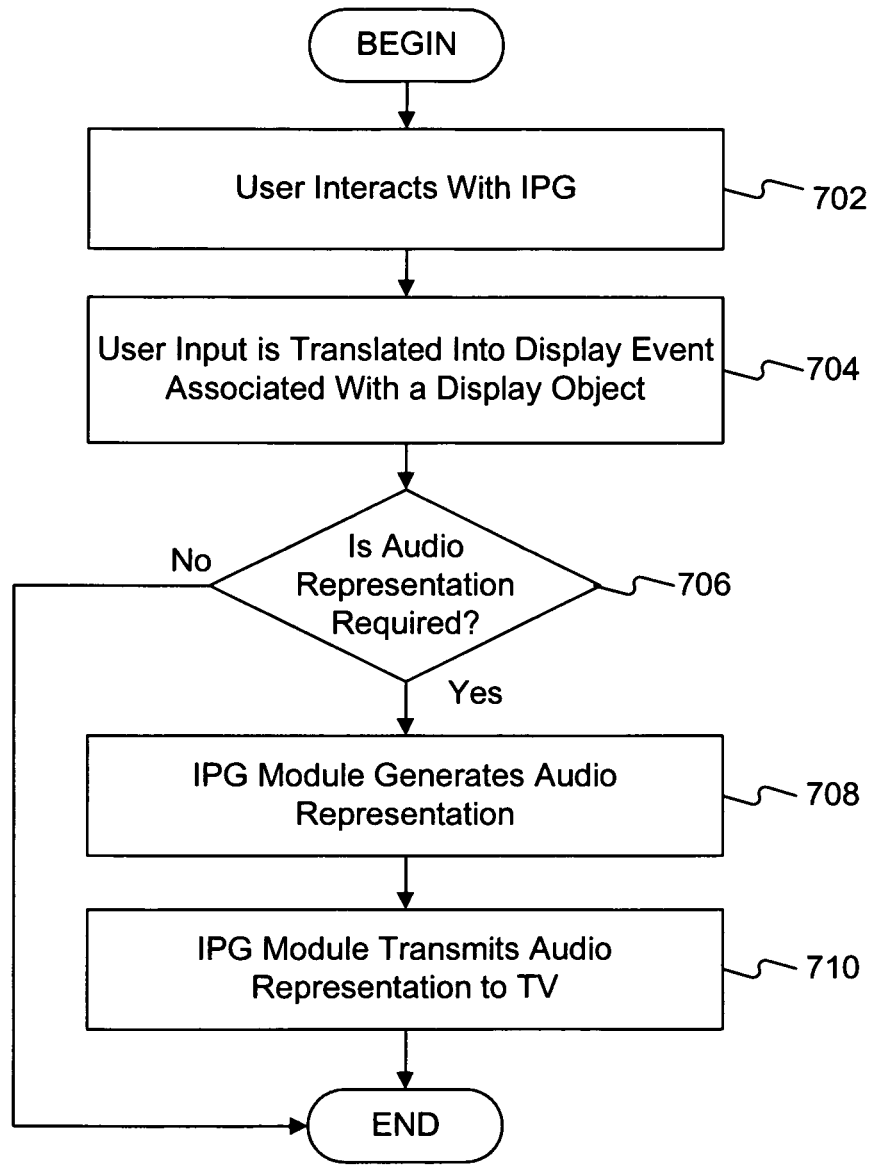
FIG. 7 is a flowchart of the process for generating audio representations for display objects consistent with an embodiment of the present invention.

FIG. 7 depicts a flowchart of a process of one embodiment for generating audio representations for display objects. Users may interact with the IPG through an input device such as, for example, remote control 316 (step 702). User commands from remote control 316 may be translated into display events associated with display objects (step 704). IPG module 405 may then determine whether the display object associated with a display event requires an audio representation (step 706). If an audio representation is required, IPG module 405 may generate the audio representation (step 708) and transmit it to television 314 to be played for the user (step 710).

One skilled in the art will recognize that there may be many types of display events associated with a display object that trigger the inquiry into whether an audio representation is required for that display object or make a specific selection for audio associated with a display object. For example, a display event may be created when the user highlights a display object. A display event may also be created when the user highlights the first object in a group of objects. Additionally, a display event may also be created when a display object is first loaded or when the main IPG display is first loaded for display.

One skilled in the art will also recognize that there are many ways by which IPG module 405 may determine whether a display object requires an audio representation. In one embodiment, IPG module 404 may determine whether a display object requires an audio representation by checking a global audio representation system variable representing whether subscriber 106 wishes the IPG to produce audio representations of display objects. The global audio representation system variable may be stored as part of subscriber data 406. Subscriber 106 may set this variable in many different ways such as, for example, when he or she initially sets up the system or by accessing a preferences menu of user interface 404.

In another embodiment, IPG module 405 may check for the existence of an audio representation tag to determine whether an audio representation is required for a display object. The audio representation tag may be attached or otherwise associated with display objects that require an audio representation. The audio representation tag may be part of the program guide data or may be associated to a display object in some other way.

Furthermore, one skilled in the art will also recognize that many types of display objects can require audio representations. For example, display objects that cannot be highlighted by a user (e.g., textual instructions, program preview information) may also require audio representations.

In one embodiment, IPG module 405 may generate an audio representation of a display object by utilizing a text-to-speech converter (not shown) to convert the text associated with the display object into audible speech. For example, if a user highlights a button labeled "Channel 7" on the IPG display and an audio representation is required for that button, then IPG module 405 may utilize a conventional text-to-speech converter to convert the text "Channel 7" into the audio representation. This audio representation may then be transmitted to the television and the user may hear the words "Channel 7" from the television speakers.

In another embodiment, IPG module 405 may not generate the audio representation of a display object but may instead receive the audio representation from service provider 102. Service provider 102 may transmit the requested audio representation to set top box 312 from a service provider server such as, for example, enhanced television services system 204. Enhanced television services system 204 may utilize a text-to-speech converter (not shown) to convert the text associated with the display object into an audio representation of the display object. Enhanced television services system 204 may then transmit the audio representation to IPG module 405. Alternatively, enhanced television services system 204 may contain an audio representation database (not shown) that contains the audio representations associated with display objects. Enhanced television services system 204 may locate the audio representation associated with the specific display object requested by IPG module 405 in the audio representation database and transmit it to IPG module 405.

One skilled in the art will also recognize that any information may be used as an audio representation for a display object, not only the text that is displayed within the display object. In one embodiment, information related to other display objects may be combined with information displayed within the display object to create the audio description of that display object. For example, if a user highlights a cell in a program schedule table for a television program labeled "The Price is Right," the system may incorporate the information stored in the channel row and time column of the program schedule into the audio description as well as the text displayed within the button. Therefore, if the user highlights a cell labeled "The Price is Right" in a channel row labeled "Channel 4" and a time column labeled "12 pm," the system may combine the information and the audio representation may include "Channel 4, 12 pm, The Price is Right."

Furthermore, a display object need not display any text in order for it to be associated with an audio representation. In one embodiment, contextual information related to a display object but not displayed anywhere on the screen may be used to create the display object's audio representation. This type of contextual information is typically referred to as "alt text." For example, if a right arrow is displayed on the screen that, in context, means to the user, "if I click on this icon, the program guide will display the next hour of programming," then the alt text for the icon may be "display next hour." This alt text may not displayed, but it may nevertheless be associated with the right arrow icon and incorporated into the display object's audio representation by the system when the right arrow is highlighted by the user. In another embodiment, descriptive information related to a display object's environment but not displayed anywhere on the screen may be used to create the display object's audio representation. For example, if all the choices are sports related and there are images of various sports surrounding the choices to indicate visually to a user then descriptively to the user it may say, "now in the sports channel area of the program guide."

Additionally, one skilled in the art will recognize that IPG module 405 does not have to be implemented in set top box 312. For example, IPG module 405 may be implemented on a service provider server such as, for example, an audio IPG system (not shown) or enhanced television services system 204; or it may be implemented in television 314. In one embodiment, enhanced television services system 204 may transmit IPG display information to set-top box 312 over access network 108 to be output on television 314.

The preferred embodiments described herein provide a technique that enhances the IPG interaction of typical users and enables disabled users with visual impairments and/or users who cannot read (e.g., children) to use services offered by a service provider through the television by being able to navigate and select options from an IPG displayed on the television.

The foregoing description of the preferred embodiments implemented consistent with the present invention has been presented for purposes of illustration and description. It is not exhaustive and does not limit the invention to the precise forms disclosed. Modifications and variations are possible in light of the above teachings or may be acquired from practice of the preferred embodiments. For example, in one possible variation, there may be two separate interactive programming guides: a visual IPG, and an audio IPG. In this embodiment, if the user chooses audio IPG, then the entire IPG may be provided by a remote audio IPG server (not shown) over access network 108. When the user interacts with the IPG using, for example, remote control 316, requests may be made to the audio IPG server to play certain audio files and to wait for additional input. The audio IPG may work independent from and differently than a visual IPG and may have a completely different logic and flow than a visual IPG. Additional modifications and variations may be realized, for example, by implementing the described embodiments in hardware modules alone, in a combination of hardware and software modules, or in a software module that runs on a general purpose processor.

Other embodiments implemented consistent with the present invention will be apparent to those skilled in the art from consideration of the specification and practice of the preferred embodiments disclosed herein. It is intended that the specification and examples be considered as exemplary only, with a true scope and spirit of the invention being indicated by the following claims.

We claim:

1. A system comprising:
   a network terminal, the network terminal connected to an access network and an output device, the network terminal including:
   an interactive programming guide (IPG) module to:
      present an IPG to the output device, the IPG including a display environment to display a plurality of display objects, where each display object, of the plurality of display objects, is associated with an audio representation tag that comprises information, not being displayed to a user of the output device, that is common to at least one other display object of the plurality of display objects, and that is based on an image included in the display environment,
      determine whether an audio representation is associated with one of the plurality of display objects, based on the audio representation tag associated with the one of the plurality of display objects,
      provide, when the audio representation is associated with the one of the plurality of display objects, the audio representation to the output device, for output, as audio data.

2. The system of claim 1, where the network terminal further includes:
   a text-to-speech reader, and
   where the IPG module is further to:
      generate the audio representation using the text-to-speech reader when the audio representation is associated with the one of the plurality of display objects.

3. The system of claim 1, where the IPG module is further to:
   receive the audio representation, from a remote system, over the access network.

4. The system of claim 1, where the audio representation tag further comprises descriptive information, and
   where the IPG module is further to:
      generate, when the audio representation tag is associated with the one of the plurality of display objects, the audio representation based on the descriptive information.

5. The system of claim 4, where the descriptive information comprises contextual information that is not being displayed on the output device and is associated with the one of the plurality of display objects.

6. The system of claim 1, where the network terminal is a set top box, and the output device is a television.

7. The system of claim 1, where the plurality of display objects comprise program listings.

8. The system of claim 1, where the IPG module determines whether the audio representation is associated with the one of the plurality of display objects based on a user specified variable.

9. The system of claim 1, where the IPG module determines whether the audio representation is associated with the one of the plurality of display objects based on a variable stored on a server accessed via the access network.

10. The system of claim 1, further comprising:
    a remote system communicatively coupled to the access network, the remote system to:
    receive a request for the audio representation from the network terminal, and
    transmit the audio representation to the network terminal in response to the request.

11. The system of claim 10, where the remote system includes:
    a text-to-speech reader, and
    where the remote system is further to:
       generate the audio representation using the text-to-speech reader.

12. The system of claim 10, further comprising:
    an audio representation database communicatively coupled to the remote system and storing the audio representation, and
    where the remote system is further to retrieve the audio representation from the audio representation database.

13. A device comprising:
    a memory storing a program guide, where the program guide includes a plurality of listings;
    one or more processors to:
       provide the program guide to an output device, associated with the device, to cause the plurality of listings to be displayed in a display environment via a display of the output device,
    receive an indication of a selection of a first listing, of the plurality of listings,
    determine that the first listing includes a tag that indicates that an audio representation is associated with the first listing,
    where the tag includes information that is:
       not being displayed in the display environment,
       common to at least a second, different listing, of the plurality of listings, and
       based on one or more images included in the display environment,
    obtain the audio representation based on the first listing including the tag, and
    provide the audio representation to the output device.

14. The device of claim 13, where the audio representation comprises audio content associated with the first listing.

15. The device of claim 13, where, when obtaining the audio representation, the one or more processors are further to:
    generate the audio representation based on the first listing using text-to-speech conversion.

16. The device of claim 13, where the one or more processors are further to:

receive the plurality of listings from a remote system a network, and
store the plurality of listings in the memory, and
where, when obtaining the audio representation, the one or more processors are to:
retrieve the audio representation from the memory.

17. A method comprising:
providing an Interactive Programming Guide (IPG) to a user, the IPG including:
a display environment to display a plurality of display objects,
where each display object, of the plurality of display objects, is associated with an audio representation tag that comprises information that is:
not being displayed to the user,
common to at least one other display object, of the plurality of display objects, and
based on an image included in the display environment;
receiving, from the user, a selection of a first display object, of the plurality of display objects;
obtaining, in response to receiving the selection of the first display object, an audio representation based on the audio representation tag associated with first display object; and
outputting the audio representation for audible presentation of the audio representation to the user.

18. The method of claim 17, further including:
generating the audio representation using a text-to-speech reader.

19. The method of claim 17, where obtaining the audio representation includes:
requesting the audio representation from a service provider, and
receiving the audio representation from the service provider based on the requesting.

20. The method of claim 19, where a remotely located system retrieves the audio representation from an audio representation database.

21. The method of claim 17, where the audio representation tag, associated with the first display object, further comprises contextual information, not being displayed to the user, associated with the first display object, and
where the audio representation is based on the contextual information.

* * * * *